United States Patent [19]

Fischer et al.

[11] Patent Number: 4,594,290
[45] Date of Patent: Jun. 10, 1986

[54] IMPACT RESISTANT LAMINATE

[75] Inventors: William F. Fischer, Orange; Donald P. LeMasters, Buena Park; William C. Harbison, Lake Forest, all of Calif.

[73] Assignee: Swedlow, Inc., Garden Grove, Calif.

[21] Appl. No.: 704,133

[22] Filed: Feb. 20, 1985

Related U.S. Application Data

[63] Continuation of Ser. No. 447,018, Dec. 6, 1982, abandoned.

[51] Int. Cl.[4] .................. B32B 7/02; B32B 27/40; B32B 17/10
[52] U.S. Cl. ..................... 428/212; 428/412; 428/423.3; 428/424.4; 428/425.6; 428/426; 428/911; 428/522; 89/36.02; 109/80; 156/331.4
[58] Field of Search ............. 428/911, 423.3, 412, 428/522, 424.4, 425.6, 212; 109/80; 89/36 A; 156/331.4

[56] References Cited

U.S. PATENT DOCUMENTS

| | | | |
|---|---|---|---|
| Re. 29,772 | 9/1978 | Niederhauser | 528/49 |
| 3,657,057 | 4/1972 | Shorr | 428/423.3 |
| 3,700,534 | 10/1972 | Cook | 428/911 |
| 4,312,903 | 1/1982 | Molari | 428/911 |
| 4,322,476 | 3/1982 | Molari | 428/412 |
| 4,328,277 | 5/1982 | Molari | 428/412 |

Primary Examiner—Ellis P. Robinson
Attorney, Agent, or Firm—Pretty, Schroeder, Brueggemann & Clark

[57] ABSTRACT

An impact resistant transparent laminate that includes as one ply a special urethane-modified acrylic sheet containing a vinyl-functional polyurethane elastomer that is a polymerization product of an aliphatic diisocyanate, one or more hydroxyl-functional polyether or polyester prepolymers, and a hydroxyl or amine-functional vinyl monomer. In a three-ply embodiment of the invention, the urethane modified acrylic sheet serves as the back ply, a hard plastic sheet formed of a material like cast acrylic serves as the front ply, and a thin sheet having high elongation such as polyurethane serves as an intermediate ply. In a five-ply embodiment of the invention, the laminate further includes a second thin sheet having high elongation disposed immediately behind the urethane-modified acrylic ply and a ductile plastic sheet formed of a material like polycarbonate to serve as its back ply.

2 Claims, 2 Drawing Figures

IMPACT RESISTANT LAMINATE

This application is a continuation of application Ser. No. 447,018, filed 12/6/82 now abandoned.

BACKGROUND OF THE INVENTION

This invention relates generally to transparent laminates, and, more particularly, to transparent laminates having an improved ballistic response.

An example of one prior art transparent laminate of this particular type is disclosed in U.S. Pat. No. 3,700,534 to R. L. Cook. The disclosed laminate includes a glass face ply and a stretched polymethylmethacrylate substrate, with a polymethylmethacrylate cement adhesive layer disposed therebetween. Other impact resistant transparent laminates are disclosed in U.S. Pat. Nos. 4,322,476 and 4,328,277 to R. E. Molari, Jr. These two patents disclose laminates having front or impact shock receiving layers selected from the group consisting of glasses and solid resinous materials such as polycarbonate, acrylic and rubber-modified acrylics, among many other materials. The back lamina, facing away from the direction of impact, is formed of polycarbonate.

Although the transparent laminates described in these patents are generally effective in many situations, they are not believed to be entirely satisfactory. In particular, they do not have as high a ballistic response as is believed possible for a laminate of equivalent thickness and weight.

Monolithic polycarbonate and acrylic are generally not believed to be entirely satisfactory bullet-resistant materials. Laminates having several layers of these materials, however, function much better and are frequently used in bullet resistance situations.

Another monolithic material that can be used as a bullet resistant material is disclosed in U.S. Pat. No. Re. 29,772 issued to W. D. Niederhauser et al. The material is a rigid thermoplastic acrylic polymer with an elastomeric urethane impact modifier, preferably based on a polyester, an aliphatic diisocyanate and a glycol chain extender. The polymer is terminated with a vinyl-functional monomer capable of ethylenic polymerization grafting with an acrylic polymer. This material is believed to have a somewhat better impact resistance than monolithic polycarbonate, but unfortunately suffers from poor weatherability and maintains a high degree of transparency over only a relatively narrow temperature range.

It should therefore be appreciated that there still is a need for an improved transparent laminate having a high ballistic response, which can provide even higher projectile stopping power without any serious optical deficiencies. The present invention fulfills this need.

SUMMARY OF THE INVENTION

The present invention is embodied in a transparent laminate having a high ballistic response. In accordance with the invention, the laminate includes at least three transparent plies having the following characteristics. The first ply, which is disposed in the direction of an expected impact, is formed of glass or a hard, transparent plastic sheet, with a modulus of elasticity of 300,000 psi or greater. The second ply, which is disposed behind the first ply, is formed of a transparent polymeric sheet having a tensile elongation of 100 percent or greater and a modulus of elasticity of 20,000 psi or less. Finally, the third ply, which is disposed behind the second ply, consists essentially of a transparent urethane-modified acrylic sheet containing 5 to 40 percent by weight vinyl-functional polyurethane elastomer that is a polymerization product of (1) a suitable aliphatic or cycloaliphatic diisocyanate, (2) one or more suitable hydroxyl-functional polyether or polyester prepolymers, each with two or more hydroxyl groups, and (3) a suitable hydroxyl or amine-functional vinyl monomer.

All three plies have been used in the past for various purposes, but never together as an impact resistant laminate. The laminate has a substantially better ballistic response than any one of the three materials by itself in an equivalent thickness or weight. Moreover, the weatherability and temperature hazing drawbacks of the third ply alone are avoided, because it is insulated from the laminate's exterior surface, which might be exposed to hot or cold weather.

In one preferred embodiment, the first ply consists essentially of polymethyl methacrylate, preferably cast sheet, and the second ply consists essentially of an aliphatic polyurethane. The third ply is a product of polymerization of a solution of the polyurethane elastomer dissolved in 60 to 95 percent by weight of a vinyl monomer mixture, of which at least 90 percent is methyl methacrylate. The one or more polyether or polyester prepolymers used in producing the polyurethane elastomer preferably include both a linear condensation polymer having terminal hydroxyl groups and a polyol having at least two hydroxyl groups. The amount of the polyol relative to the linear condensation polymer, on an equivalent basis, is between 0.01:0.99 and 0.90:0.10. The vinyl monomer used in producing the elastomer preferably is a reactive hydrogen-containing monoethylenically-unsaturated monomer in which the reactive hydrogen is in a hydroxyl or amine group.

The polyurethane elastomer component of the third ply is a condensation product of the reactive hydrogen-containing monoethylenically-unsaturated monomer and a reaction product derived from (1) the aliphatic or cycloaliphatic diisocyanate, (2) the linear condensation polymer, and (3) the polyol. The ratio of (1) to the total of (2) and (3) is in the range of 1.001 to 2.0, on an equivalent basis, and sufficient to provide in the reaction product an equivalent weight, as determined by isocyanate titration, of at least 4000. Also, the amount of (3) relative to (2), on an equivalent basis, is between 0.01:0.99 and 0.90:0.10. An excess of the reactive monomer is used to effect reaction of all the isocyanate groups in the reaction product.

In another embodiment of the invention, the laminate further includes a fourth ply disposed behind the third ply and formed of a material substantially identical to that of the second ply, along with a fifth ply disposed behind the fourth ply and formed of a ductile transparent plastic sheet having ultimate tensile elongation of 30 percent or greater and modulus of elasticity of 150,000 psi or greater. The fifth ply preferably consists essentially of polycarbonate, and it functions primarily as a spall shield. The second and fourth plies preferably have uniform thicknesses of at least about 10 mils, and the first, third and fifth plies all have thicknesses substantially greater than the thicknesses of the second and fourth plies. The respective first, third and fifth plies preferably have uniform thicknesses in a proportion of about 2:4:1.

Other aspects and advantages of the present invention should become apparent from the following description of the preferred embodiments, taken in conjunction with the accompanying drawings which illustrate, by way of example, the principles of the invention.

DESCRIPTION OF THE PREFERRED EMBODIMENTS

Figure 1:
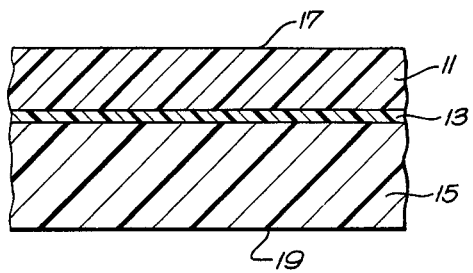
FIG. 1 is a cross-sectional view of a three-ply transparent laminate in accordance with a first embodiment of the present invention.

Referring now to the drawings, and particularly to FIG. 1, there is shown a first preferred embodiment of a transparent laminate constructed in accordance with the present invention. The laminate includes three transparent plies, designated by the numerals 11, 13 and 15, with the first ply 11 being oriented in the direction of an anticipated impact. The three plies cooperate to provide a ballistic response that is unexpectedly high, considering the laminate's thickness and weight.

In accordance with the invention, the laminate's successive plies are formed of the following materials. The first ply 11 is a sheet of glass or cast acrylic, which are relatively hard materials, with high modulus of elasticity. The second ply 13 is disposed behind the first ply and is a thin polyurethane sheet, which has relatively high tensile elongation and relatively low modulus of elasticity. The third ply 15 is disposed behind the second ply and is formed of a special urethane-modified acrylic sheet, which is constructed as follows:

The following materials are used to prepare a solution of urethane elastomer in methyl methacrylate:

| Material | Grams |
| --- | --- |
| Polycaprolactone diol, $M_n = 830$ | 3,298 |
| Methyl methacrylate | 10,386 |
| Polycaprolactone triol, $M_n = 540$ | 67 |
| 2,6-Di-t-butyl-4-methylphenol | 1.8 |
| Dibutyltin dilaurate | 20 |
| Methylene-bis-(cyclohexyl isocyanate) | 1,086 |

These materials are added to a 22 liter 4-neck flask in the order listed and polymerized at 140° F. by the method described in Example 1 of U.S. Pat. No. Re. 29,772 to W. D. Niederhauser et al., mentioned above. After 8 to 10 hours, the equivalent weight, as determined by isocyanate titration, is normally in the range of 20,000 to 25,000. If the equivalent weight is below 20,000, the reaction is continued until it reaches the prescribed range. A small amount of polycaprolactone diol/triol mixture, in the same ratio as the initial charge, is sometimes added to adjust the isocyanate/hydroxyl ratio so that the prescribed equivalent weight range can be reached. The 2,6-di-t-butyl-4-methylphenol serves as an inhibitor, preventing the methyl methacrylate solvent from polymerizing at this stage. The dibutyltin dilaurate serves as a catalyst for the diol/triol-isocyanate reaction.

After the equivalent weight of the product reaches the prescribed range, hydroxyethyl methacrylate (147.6 grams) and methyl methacrylate (4516 grams) are added. The reaction is then continued at 140° F. for 8 additional hours.

Two casting mixes, designated A and B, are then prepared from this urethane/methyl methacrylate solution by dissolving the following materials:

| Material | Percent by Weight A | Percent by Weight B |
| --- | --- | --- |
| Urethane/methyl methacrylate solution | 60.84 | 92.14 |
| Methyl methacrylate | 31.72 | 0 |
| Hydroxyethyl methacrylate | 1.00 | 1.00 |
| Butyl acrylate | 4.25 | 4.25 |
| Styrene | 1.50 | 1.50 |
| t-Butyl peroxypivalate | 0.022 | 0.022 |
| Acetyl peroxide | 0.022 | 0.022 |
| t-Butyl peroxyacetate | 0.096 | 0.096 |

The resultant solutions are each polymerized into a sheet about 0.5 inches thick using the method described in Example 12 of U.S. Pat. No. Re. 29,772. The polymerization cycle is preferably 6 hours at 120° F., 18 hours at 135° F., 4 hours at 140° F., 1.5 hours at 250° F. and finally 4 hours at 190° F. The hydroxyethyl methacrylate, butyl acrylate and styrene all function as reactive monomers with the methyl methacrylate, to improve the optical qualities of the resultant sheet. The t-butyl peroxypivalate, acetyl peroxide and t-butyl peroxyacetate all serve as reaction initiators, generating free radicals at high temperatures. These initiators of course must overcome the 2,6-di-t-butyl-4-methylphenol polymerization inhibitor still present in the urethane/methyl methacrylate solution. The resulting clear sheets each have a light transmittance of about 90 percent and haze of about 2 percent at 72° F., as determined according to ASTM D-1003-61.

Besides glass and cast acrylic, other suitable polymeric materials for the first ply 11 include biaxially-oriented grades of polymethyl methacrylate, polystyrene, polystyrene-co-acrylonitrile, polyvinyl chloride, poly-methylstyrene, poly-p-methylstyrene, polyacrylonitrile, polymethyl methacrylate-co-styrene, polymethyl methacrylate-co-acrylonitrile, polystyrene-co-maleic anhydride, polycarbonate, polysulfone, polyethersulfone, poly-4-methylpentene-1, styrene/butadiene block copolymers (clear grades), polyetherimide, polyacrylates (clear grades), polyamides (clear grades), polyester/carbonate copolymers, polyetherketone, epoxies, phenolics and copolymers of the above with other monomers.

Besides polyurethanes, other suitable materials for the second ply 13 include polydimethylsiloxane, polyethyl acrylate, polybutyl acrylate, polyethylene-comethyl acrylate, polyethylene-co-vinyl acetate, polyethylene-co-propylene, ethylene/propylene/diene terpolymers (EPDMs), polybutadiene, polybutadiene-co-acrylonitrile, polybutadiene-co-styrene, chlorinated polyethylene, polychloroprene, polyisoprene, polyisobutylene, polyisobutylene-co-isoprene, halogenated polyisobutylene-co-isoprene, polyepichlorohydrin, polyepichlorohydrin-co-ethylene oxide, polypropylene oxide, polysulfide elastomers, polyvinyl butyral and ethylene/methacrylic acid ionomers, and ethylene/vinyl acetate/vinyl alcohol terpolymers, plus copolymers and modified or plasticized grades of the above materials meeting the previously specified property requirements.

The transparent laminate of FIG. 1 is preferably prepared in an autoclave using the following process:

(with ¼ inch individual plies) were tested under comparable ballistics conditions, as detailed in Table 1:

TABLE I

| Transparency | Composition | Total Thickness | Performance Upon Impact With A .357 Magnum Projectile at 75° F. |
|---|---|---|---|
| Example 1 | Acrivue 320 cast acrylic (.25")/ polyurethane (.05")/ urethane-modified acrylic (A) (.45") | 0.75 inches | Defeated three projectiles, no penetration, no spall. |
| A | Monolithic cast acrylic (Acrivue 320) | 1.25 inches | Complete penetration, massive cracking with only one projectile |
| B | Monolithic cast acrylic (Acrivue 320) | 2.00 inches | Massive cracking with one projectile, but no penetration. Complete penetration with the second projectile. |
| C | Laminated polycarbonate (Lexgard) | 0.75 inches | Complete penetration with all three projectiles. |
| D | Laminated polycarbonate (Lexgard) | 1.25 inches | No penetration or spall with three projectiles. |

(1) Heat to 210° F., at 185 psi, for 6 hours;
(2) Cool, while maintaining pressure at 185 psi, for 2 hours; and
(3) Reduce pressure and remove.

The outwardly-facing surfaces 17 and 19 of the first ply 11 and third ply 15, respectively, are coated with a suitable abrasion-resistant coating prior to lamination. Also, a suitable acrylic primer is used on the inwardly-facing surfaces of the first and third plies, to provide a tenacious bond with the second ply 13. To facilitate the removal of trapped air, the laminate is encased in a conventional Capran vacuum bag and placed under vacuum prior to and during autoclave lamination.

EXAMPLE 1

In a first example of the three-ply transparent laminate of FIG. 1, the first ply 11 was Acrivue 320 cast acrylic in a thickness of 0.25 inches, the second ply 13 was a transparent aliphatic polyether polyurethane in a thickness of 0.05 inches and the third ply was the special urethane-modified acrylic (A) described above in a thickness of 0.45 inches. To test the ballistic response of this first example, it was impacted with three .357 magnum projectiles, in a temperature environment of 75° F. Each 158 grain, soft point projectile was fired at about 1235 feet per second, from a distance of 15 feet, to deliver a total muzzle energy of 535 footpounds. These test conditions are specified in the Underwriters Laboratories Class II method for high power small arms.

The first example clearly defeated the three projectiles. No penetration through the laminate and no spalling of the third ply 15 was observed.

In comparison with the first example, monolithic cast acrylic sheeting and laminated polycarbonate sheeting The superiority of Example 1 of the three-ply laminate of FIG. 1 is clearly demonstrated by Table 1. The monolithic cast acrylic failed even in a thickness of 2.00 inches. Laminated polycarbonate failed at a thickness of 0.75 inches, the same as that of Example 1, and defeated the projectiles only at a thickness of 1.25 inches. Thus, for a given ballistic response, both of these alternative materials would require substantially greater size and weight than Example 1 of the present invention.

The three-ply laminate of Example 1 was also tested against three other three-ply laminates, designated samples E through G. Each included a 0.25 inch front ply of Plexiglas G cast acrylic, which is generally equivalent to the Acrivue 320 acrylic ply 11 of Example 1, and further included a 0.05 inch intermediate ply of aliphatic polyether polyurethane, which is generally equivalent to the polyurethane ply 13 of Example 1. The back plies of all three comparative samples were 0.50 inches thick, with sample E being Plexiglas G cast acrylic, sample F being Lexan polycarbonate and sample G being Plexiglas DR rubber-modified acrylic. Like Example 1, all three samples had abrasion-resistant coatings on their exterior surfaces, and all were prepared under comparable laminating conditions to those for Example 1.

Example 1 and the three comparative samples E, F and G were tested by firing three .357 magnum, 158 grain, soft point projectiles at a velocity of about 1300 feet per second from 15 feet at 75° F. Each projectile had a total muzzle energy of about 593 footpounds. As indicated in Table II, Example 1 and comparative samples F and G defeated the projectiles, but sample E did not:

TABLE II

| Transparency | Composition | Total Thickness | Performance Upon Impact With A .357 Magnum Projectile at 75° F. |
|---|---|---|---|
| Example 1 | Acrivue 320 cast acrylic (.25")/ polyurethane (.05")/ urethane-modified acrylic (A) (.45") | 0.75 inches | No penetration |
| E | Plexiglas G cast acrylic (.25")/ polyurethane (.05")/ Plexiglas G cast acrylic (.50") | 0.80 inches | Penetration |
| F | Plexiglas G cast acrylic (.25")/ polyurethane (.05")/ Lexan polycarbonate (.50") | 0.80 inches | No penetration |
| G | Plexiglas G cast acrylic (.25")/ polyurethane (.05")/ | 0.80 inches | No penetration |

TABLE II-continued

| Transparency | Composition | Total Thickness | Performance Upon Impact With A .357 Magnum Projectile at 75° F. |
|---|---|---|---|
| | Plexiglas DR rubber-modified acrylic (.50") | | |

It should be noted that comparative samples E, F and G have total thicknesses slightly greater than that of Example 1. To demonstrate the improved ballistic response of a three-ply laminate having a back ply of urethane-modified acrylic, a second example was prepared having a total thickness the same as that of comparative samples F and G.

EXAMPLE 2

In a second example of a three-ply laminate embodying the invention, the thickness of the special urethane modified acrylic (A) third ply 15 was increased to 0.50 inches. All other characteristics of this laminate example, and the process for manufacturing it, are comparable to those of Example 1.

To test the ballistic response of this example, it was impacted with three .44 magnum projectiles, each weighing 240 grains and having a lead point. Firing was conducted at 75° F. from a distance of 15 feet, at a velocity of about 1470 feet per second, to deliver a muzzle energy of about 1150 foot-pounds. Example 2 clearly defeated the three projectiles.

Comparative samples F and G, identified above, were tested under the same ballistics conditions. As indicated in Table III, these two laminates were both penetrated with the first .44 magnum projectile:

TABLE III

| Transparency | Composition | Total Thickness | Performance Upon Impact With A .44 Magnum Projectile at 75° F. |
|---|---|---|---|
| Example 2 | Plexiglas G cast acrylic (.25")/ polyurethane (.05")/ urethane-modified acrylic (A) (.50") | 0.80 inches | No penetration with three shots |
| F | Plexiglas G cast acrylic (.25")/ polyurethane (.05")/ Lexan polycarbonate (.50") | 0.80 inches | Penetration, one shot |
| G | Plexiglas G cast acrylic (.25")/ polyurethane (.05")/ Plexiglas DR rubber-modified acrylic (.50") | 0.80 inches | Penetration, one shot |

EXAMPLE 3

In a third example of a three-ply laminate embodying the invention, the first ply 11 was formed of tempered glass in a thickness of 0.187 inches, the second ply 13 was formed of polyurethane in a thickness of 0.05 inches, and the third ply 15 was formed of the special urethane-modified acrylic of casting mix A in a thickness of 0.375 inches. The process for manufacturing this laminate is comparable to that of Example 1.

To test the ballistic responses of this laminate, it was impacted with a .30 caliber, 44 grain, fragment-simulating projectile fired from a distance of about 15 feet at a velocity of about 2300 feet per second. The test was conducted at 75° F. Example 3 clearly defeated the projectile.

In comparison with the third example, two comparative samples, designated H and I were tested under comparable ballistic conditions, as detailed in Table IV, below. Samples H and I differed from Example 3 only in that the third ply of sample H was formed of Lexan polycarbonate and the third ply of sample I was formed of Plexiglas G cast acrylic in a slightly greater thickness. Neither comparative sample defeated the projectile.

TABLE IV

| Transparency | Composition | Total Thickness | Performance Upon Impact With A .30 Caliber/44 grain fragment at 75° F. |
|---|---|---|---|
| Example 3 | Tempered glass (.187")/ polyurethane (.05")/ urethane-modified acrylic (A) (.375") | 0.612 inches | No penetration |
| H | Tempered glass (.187")/ polyurethane (.05")/ Lexan polycarbonate (.375") | 0.612 inches | Penetration |
| I | Tempered glass (.187")/ polyurethane (.05")/ Plexiglass G (.500") | 0.737 inches | Penetration |

The results of Tables III and IV demonstrate the superiority of a three-ply laminate having the special urethane-modified acrylic as its third or back ply over otherwise equivalent laminates having back plies of polycarbonate, acrylic or conventional rubber-modified acrylic.

Figure 2:
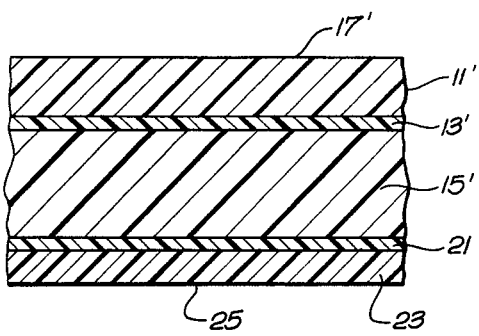
FIG. 2 is a cross-sectional view of a five-ply transparent laminate in accordance with a second embodiment of the invention.

A five-ply transparent laminate in accordance with a second preferred embodiment of the invention is depicted in FIG. 2. Its first three plies, designated by the numerals 11', 13' and 15', respectively, are substantially identical to the first three plies of the embodiment of FIG. 1. In particular, the first ply which is disposed in the direction of an anticipated impact, is formed of cast acrylic, the second ply is formed of a thin aliphatic polyether polyurethane sheet, and the third ply is formed of the special urethane-modified acrylic defined above.

The five-ply laminate of FIG. 2 further includes a fourth ply 21 disposed behind the third ply 15' and formed of a polyurethane sheet similar to the second ply 13', and a fifth ply 23 disposed behind the fourth ply and formed of polycarbonate, which is a ductile plastic having high tensile elongation and high modulus of elasticity. Suitable materials for the fourth ply 21 are the same as those for the second ply 13', which are listed above.

Suitable materials for the fifth ply 23 include polycarbonate, acrylonitrile/styrene/butadiene terpolymers (clear grades), acrylonitrile/styrene/acrylate terpolymers (clear grades), cellulosics, polysulfone, polyethersulfone, poly-4-methylpentene-1, styrene/butadiene block copolymers (clear grades), polyetherimide, polyarylates (clear fully aromatic polyesters), polyamides (clear grades), polyester/carbonate copolymers, polyetherketone, polyolefins-ethylene, propylene, butylene (clear, non-oriented and oriented), glycol modified polyethylene terephthalate, modified polyvinyl chloride (clear grades), silicone/acrylate copolymers, and impact-modified acrylics (clear grades).

The transparent laminate of FIG. 2 is preferably prepared in the same process as the laminate of FIG. 1, described above. Also, the outwardly-facing surfaces 17' and 25 of the first ply 11' and fifth ply 23, respectively, are coated with a suitable abrasion-resistant coating prior to lamination. The polycarbonate fifth ply is of course initially primed with an acrylic primer, necessary to obtain adhesion of the abrasion-resistant coating. An acrylic primer is also used to enhance adhesion between the polyurethane second and fourth plies 13' and 21 and the acrylic and urethane-modified acrylic first and third plies 11' and 15', respectively.

EXAMPLE 4

In one example of the five-ply transparent laminate of the invention, the first ply 11' was formed of Acrivue 320 cast acrylic in a thickness of 0.25 inches, the second and fourth plies 13' and 21 were both formed of a transparent aliphatic polyether polyurethane in thicknesses of 0.05 inches, the third ply 15' was the special urethane-modified acrylic (A) in a thickness of 0.45 inches and the fifth ply 23 was formed of Lexan polycarbonate in a thickness of 0.125 inches.

To test the ballistic response of this example, it was impacted with three .44 magnum, 240 grain, lead point projectiles fired from a distance of 15 feet, at about 1470 feet per second. The muzzle energy of this impact was about 1150 foot-pounds. It was tested at both a uniform temperature of 75° F. and a temperature gradient of −26° F. to +75° F., with the colder temperature being adjacent the first ply 11' and the warmer temperature being adjacent the fifth ply 23. These test conditions are specified in the Underwriters' Laboratories Class III method for super power small arms. As indicated in Table V, this five-ply example of the invention clearly defeated these projectiles.

In comparison with the five-ply laminate of Example 4, several other transparencies (designated by the letters J through U), including both monolithic materials and laminates, were tested under comparable ballistics conditions, as detailed in Table V. All were tested only in a temperature environment of +75° F. The last two laminates listed, designated T and U, defeated the projectiles, but as will be demonstrated below, they failed to satisfy an additional, more stringent ballistics test.

TABLE V

| Transparency | Composition | Total Thickness | Performance Upon Impact With A .44 Magnum Projectile |
|---|---|---|---|
| Example 4 | Acrivue 320 cast acrylic (.25")/ polyurethane (.05")/ urethane-modified acrylic (A) (.45")/ polyurethane (.05")/ Lexan polycarbonate (.125") | 0.925" | No penetration or spall with one projectile (75° F.) |
| Example 4 | Acrivue 320 cast acrylic (.25")/ polyurethane (.05")/ urethane-modified acrylic (A) (.45")/ polyurethane (.05")/ Lexan polycarbonate (.125") | 0.925" | No penetration or spall with three projectiles (−26° F. to +75° F. gradient) |
| J | Monolithic Acrivue 320 cast acrylic | 1.25" | Massive cracking and penetration with one projectile |
| K | Monolithic Acrivue 320 cast acrylic | 4.00" | Massive cracking, but no penetration with one projectile. Penetration with second projectile |
| L | Laminated Lexan polycarbonate (Lexgard) | 1.00" | Penetration with one projectile |
| M | Laminated Lexan polycarbonate (Lexgard) | 1.25" | No penetration or spall with three projectiles |
| N | Acrivue 320 cast acrylic (.375")/ polyurethane (.05")/ Acrivue 350 stretched acrylic (.750") | 1.75" | Penetration with one projectile |
| O | Plexiglass G cast acrylic (.25")/ polyurethane (.05")/ Lexan polycarbonate (.50")/ polyurethane (0.5 ")/ urethane-modified acrylic (A) (.125") | 0.975" | Penetration with one projectile |
| P | Plexiglass G cast acrylic (.25")/ polyurethane (.05")/ Lexan polycarbonate (.125")/ | 0.975" | Penetration with one projectile |

TABLE V-continued

| Transparency | Composition | Total Thickness | Performance Upon Impact With A .44 Magnum Projectile |
|---|---|---|---|
| Q | polyurethane (.05")/ urethane-modified acrylic (A) (.50") Plexiglas G cast acrylic (.25")/ polyurethane (.05")/ Plexiglas DR rubber-modified acrylic (.50")/ polyurethane (.05")/ Plexiglas DR rubber-modified acrylic (.125") | 0.975" | Penetration with one projectile |
| R | Plexiglas G cast acrylic (.25")/ polyurethane (.05")/ Lexan polycarbonate (.50")/ polyurethane (.05")/ Plexiglas DR rubber-modified acrylic (.125") | 0.975" | Penetration with one projectile |
| S | Plexiglas G cast acrylic (.25")/ polyurethane (.05")/ urethane-modified acrylic (A) (.50")/ polyurethane (.05")/ urethane-modified acrylic (A) (.125") | 0.975" | Penetration only with third shot |
| T | Plexiglas G cast acrylic (.25")/ polyurethane (.05")/ Plexiglas DR rubber-modified acrylic (.50")/ polyurethane (.05")/ Lexan polycarbonate (.125") | 0.975" | No penetration |
| U | Plexiglas G cast acrylic (.25")/ polyurethane (.05")/ Lexan polycarbonate (.50")/ polyurethane (.05")/ Lexan polycarbonate (.125") | 0.975" | No penetration |

As indicated, comparative samples J through U are all slightly thicker than the five-ply Example 4 of the invention, yet only samples M, S, T and U likewise defeated the .44 magnum projectiles. Therefore, to further compare the laminate of the invention with the five-ply samples T and U, another five-ply example was constructed.

EXAMPLE 5

This example is identical to Example 4, except that its third ply 15' is increased in thickness from 0.45 inches to 0.50 inches. This brings the laminate's total thickness to 0.975 inches, which corresponds to that of comparative samples T and U.

Example 5 was tested by firing at it a 0.30 caliber, 44 grain fragment simulator projectile, at a velocity of about 2344 feet per second from a distance of 15 feet. The test was conducted in a temperature environment of 80° F. Example 5 exhibited no penetration. Comparative samples T and U failed under comparable ballistics conditions, as detailed in Table VI:

TABLE VI

| Transparency | Composition | Total Thickness | Performance Upon Impact With A 30 Caliber, 44 Grain Fragment |
|---|---|---|---|
| Example 5 | Acrivue 320 cast acrylic (.25")/ polyurethane (.05")/ urethane-modified acrylic (A) (.50")/ polyurethane (.05")/ Lexan polycarbonate (.125") | 0.975" | No penetration at 2344 ft/sec |
| T | Plexiglas G cast acrylic (.25")/ polyurethane (.05")/ Plexiglas DR rubber-modified acrylic (.50")/ polyurethane (.05")/ Lexan polycarbonate (.125") | 0.975" | Penetration at 2259 ft/sec |
| U | Plexiglas G cast acrylic (.25")/ polyurethane (.05")/ Lexan polycarbonate (.50")/ polyurethane (.05")/ Lexan polycarbonate (.125") | 0.975" | Penetration at 2289 ft/sec |

EXAMPLE 6

This example is identical to Example 5, except that its third ply 15' is formed from the casting mix B, described above, rather from the casting mix A. Its ballistics response was tested by firing at it a .30 caliber, 44 grain fragment-simulator projectile, at a velocity of about 2093 feet per second from a distance of about 15 feet. The test was conducted in a temperature environment of 75° F. Example 6 exhibited no penetration.

The test results presented above show that laminates containing the special urethane-modified acrylic offer a significant improvement in ballistic response over known prior laminates. Specifically, the laminates of Examples 4, 5 and 6 fared measurably better than laminates having polycarbonate, acrylic or conventional rubber-modified acrylic in place of the special urethane-modified acrylic.

The results also show that the order of the laminate's successive plies is important in achieving good ballistics performance. In the case of a five-ply laminate, it is important that the special urethane-modified acrylic be the middle ply, with a relatively hard material like glass or cast acrylic forming the front ply and a relatively ductile material like polycarbonate forming the back ply.

It should be appreciated from the foregoing description and comparative test results that the present invention provides a transparent laminate that offers an improved ballistic response over known prior transparencies. Two embodiments of the invention are disclosed, one with three plies and the other with five plies. Both offer resistance to penetration and spalling from projectiles that is measurably better than known prior monolithic materials and laminates of comparable thickness and weight.

Although the invention has been described with reference to two preferred embodiments, it should be understood by those of ordinary skill in the art that various modifications can be made without departing from the invention. Accordingly, the invention is limited only by the following claims.

We claim:

1. A transparent laminate having a high ballistic response comprising:
   a transparent first ply disposed in the direction of an expected impact and consisting essentially of polymethyl methacrylate, with modulus of elasticity of 300,000 psi or greater;
   a transparent second ply disposed immediately behind the first ply and consisting essentially of polyurethane, with tensile elongation of 100 percent or greater and modulus of elasticity of 20,000 psi or less;
   a transparent third ply disposed immediately behind the fourth ply and consisting essentially of polycarbonate, with ultimate tensile elongation of 30 percent or greater and modulus of elasticity of 150,000 psi or greater;
   wherein the second and fourth plies both have uniform thicknesses of at least about 10 mils, the first, third and fifth plies all have thicknesses substantially greater than the thicknesses of the second and fourth plies, and the respective first, third and fifth plies have uniform thicknesses in a proportion of about 2:4:1.

2. A transparent laminate having a high ballistic response comprising:
   a transparent first ply disposed in the direction of an expected impact and consisting essentially of polymethyl methacrylate, with modulus of elasticity of 300,000 psi or greater;
   a transparent second ply disposed immediately behind the first ply and consisting essentially of polyurethane, with tensile elongation of 100 percent or greater and modulus of elasticity of 20,000 psi or less;
   a transparent third ply disposed immediately behind the second ply and consisting essentially of a urethane-modified acrylic sheet that is the product of polymerizing, substantially to completion, a solution of 5 to 40 percent by weight of a prescribed polyurethane elastomer dissolved in 60 to 95 percent by weight of a vinyl monomer mixture, of which at least 90 percent is methyl methacrylate, the polyurethane elastomer being second ply and consisting essentially of a urethane-modified acrylic sheet that is the product of polymerizing, substantially to completion, a solution of 5 to 40 percent by weight of a prescribed polyurethane elastomer dissolved in 60 to 95 percent by weight of a vinyl monomer mixture, of which at least 90 percent is methyl methacrylate, the polyurethane elastomer being a condensation product of
   (a) a reaction product of
      (1) methylene-bis-(cyclohexyl isocyanate),
      (2) polycaprolactone diol, and
      (3) polycaprolactone triol, the ratio of (1) to the total of (2) and (3) being in the range of 1.001 to 2.0 equivalents of (1) per equivalent to the total of (2) and (3) and sufficient to provide in the reaction product an equivalent weight, as determined by isocyanate titration, of at least 4000, the amount of (3) relative to (2) on an equivalent basis being between 0.01:0.99 and 0.90:0.10, and
   (b) hydroxyethyl methacrylate, an excess of (b) being used to effect reaction of all the isocyanate groups in (a);
   a transparent fourth ply disposed immediately behind the third ply and consisting essentially of polyurethane, with tensile elongation of 100 percent or greater and modulus of elasticity of 20,000 psi or less; and
   a transparent fifth ply disposed immediately behind the a condensation product of
   (a) a reaction product of
      (1) an aliphatic or cycloaliphatic diisocyanate,
      (2) a diol having terminal hydroxyl groups, and
      (3) a triol having at least two hydroxyl groups, the ratio of (1) to the total of (2) and (3) being in the range of 1.001 to 2.0 equivalents of (1) per equivalent of the total of (2) and (3) and sufficient to provide in the reaction product an equivalent weight, as determined by isocyanate titration, of at least 4000, the amount of (3) relative to (2) on an equivalent basis being between 0.01:0.99 and 0.90:0.10, and
   (b) a suitable hydrogen-containing monoethylenically-unsaturated monomer selected from the group consisting of hydroxyethyl acrylate, hydroxyethyl methacrylate, and allyl alcohol, an excess of (b) being used to effect reaction of all the isocyanate groups in (a);
   a transparent fourth ply disposed immediately behind the third ply and consisting essentially of polyurethane, with tensile elongation of 100 percent or greater and modulus of elasticity of 20,000 psi or less; and
   a transparent fifth ply disposed immediately behind the fourth ply and consisting essentially of polycarbonate, with ultimate tensile elongation of 30 percent or greater and modulus of elasticity of 150,000 psi or greater;
   wherein the second and fourth plies both have uniform thicknesses of at least about 10 mils, the first, third and fifth plies all have thicknesses substantially greater than the thicknesses of the second and fourth plies, and the respective first, third and fifth plies have uniform thicknesses in a proportion of about 2:4:1.

* * * * *

UNITED STATES PATENT AND TRADEMARK OFFICE
CERTIFICATE OF CORRECTION

PATENT NO. : 4,594,290

DATED : June 10, 1986

INVENTOR(S) : William F. Fischer, Donald P. LeMasters, William C. Harbison

It is certified that error appears in the above-identified patent and that said Letters Patent is hereby corrected as shown below:

A major portion of claim 1 was improperly printed as part of claim 2. In particular, the language beginning at column 14, line 2, with the words, "second ply and ..." and ending at column 14, line 32 with the words "... immediately behind the" should be inserted at column 13, line 40, immediately after the word "the".

Signed and Sealed this

Thirtieth Day of September 1986

[SEAL]

Attest:

Attesting Officer

DONALD J. QUIGG

Commissioner of Patents and Trademarks